US009916255B2

(12) United States Patent
Solihin (10) Patent No.: US 9,916,255 B2
(45) Date of Patent: Mar. 13, 2018

(54) DATA STORAGE BASED ON MEMORY PERSISTENCY

(71) Applicant: EMPIRE TECHNOLOGY DEVELOPMENT LLC, Wilmington, DE (US)

(72) Inventor: Yan Solihin, Raleigh, NC (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 113 days.

(21) Appl. No.: 14/567,278

(22) Filed: Dec. 11, 2014

(65) Prior Publication Data

US 2016/0170897 A1 Jun. 16, 2016

(51) Int. Cl.
*G06F 12/10* (2016.01)
*G06F 12/1009* (2016.01)
(Continued)

(52) U.S. Cl.
CPC ...... *G06F 12/1009* (2013.01); *G06F 11/1446* (2013.01); *G06F 12/0868* (2013.01);
(Continued)

(58) Field of Classification Search
CPC .... G06F 12/1009; G06F 9/5016; G06F 12/08; G06F 3/0604; G06F 3/0647; G06F 2212/657; G06F 12/10; G06F 2212/205; G06F 3/0685; G06F 3/068; G06F 9/45558; G06F 12/0292; G06F 12/121;
(Continued)

(56) References Cited

U.S. PATENT DOCUMENTS 5,452,430 A 9/1995 Dievendorff et al.
8,531,880 B2 9/2013 Rao
(Continued)

OTHER PUBLICATIONS

Meza, J., et al., "A Case for Efficient Hardware-Software Cooperative Management of Storage and Memory," Proceedings of the 5th Workshop on Energy-Efficient Design (WEED), Tel-Aviv, Israel, Jun. 2013, pp. 1-7.
(Continued)

*Primary Examiner* — Tuan Thai
*Assistant Examiner* — Edward Waddy, Jr.
(74) *Attorney, Agent, or Firm* — Moritt Hock & Hamroff LLP; Steven S. Rubin, Esq.

(57) ABSTRACT

Technologies are generally described for methods and systems effective to store data in a memory module. The memory module may include a volatile portion and a non-volatile portion. The methods may comprise receiving, by a processor, a request to store the data. The request may include an indication of a virtual address. The methods may further include determining, by the processor, a persistency of the data based on the virtual address. The methods may further include performing a first operation of identifying a particular portion of the memory module based on the virtual address. The methods may further include generating a command to store the data in the particular portion of the memory module. The methods may further include controlling the operating system to perform a second operation of updating a translation lookaside buffer to indicate the persistency of the data.

21 Claims, 7 Drawing Sheets

(51) Int. Cl.
*G06F 12/0868* (2016.01)
*G06F 12/0871* (2016.01)
*G06F 12/0897* (2016.01)
*G06F 11/14* (2006.01)
*G06F 12/0804* (2016.01)

(52) U.S. Cl.
CPC ...... *G06F 12/0871* (2013.01); *G06F 12/0897* (2013.01); *G06F 12/0804* (2013.01); *G06F 2212/1032* (2013.01); *G06F 2212/205* (2013.01); *G06F 2212/311* (2013.01); *G06F 2212/502* (2013.01); *G06F 2212/657* (2013.01)

(58) Field of Classification Search
CPC .... G06F 12/1475; G06F 3/064; G06F 3/0646; G06F 2009/45583; G06F 2212/151; G06F 12/0246; G06F 12/145; G06F 2212/152; G06F 17/30362; G06F 2212/2022; G06F 2212/1044; G06F 2212/7202; G06F 3/0673; G06F 2212/50; G06F 2201/815; G06F 2212/681; G06F 2212/683; G06F 2212/1016; G06F 2212/502
USPC ............ 711/103, 6, E12.001, E12.008, 207, 711/E12.059, 203, 206, E12.061, 170, 711/E12.016, 147, 159, 162, E12.014, 711/E12.069
See application file for complete search history.

(56) References Cited

U.S. PATENT DOCUMENTS

| | | | |
|---|---|---|---|
| 8,533,404 B2 | 9/2013 | Condit et al. | |
| 9,529,708 B2 | 12/2016 | Puthiyedath et al. | |
| 2005/0235131 A1* | 10/2005 | Ware | G06F 12/0292 711/203 |
| 2007/0283124 A1* | 12/2007 | Menczak | G06F 12/109 711/207 |
| 2012/0173809 A1* | 7/2012 | Ko | G06F 12/0893 711/105 |
| 2012/0246392 A1 | 9/2012 | Cheon | |
| 2013/0332660 A1* | 12/2013 | Talagala | G06F 12/0246 711/103 |
| 2014/0281333 A1* | 9/2014 | Peterson | G06F 12/0638 711/170 |
| 2015/0100753 A1* | 4/2015 | Shen | G06F 12/1027 711/207 |

OTHER PUBLICATIONS

Moraru, I., et al., "Persistent, Protected and Cached: Building Blocks for Main Memory Data Stores," CMU-PDL-11-114, Dec. 2011, pp. 24.

Venkataraman, S., et al., "Consistent and Durable Data Structures for Non-Volatile Byte-Addressable Memory," Proceedings of the 9th USENIX conference on File and storage technologies (FAST), 2011, pp. 1-15.

* cited by examiner

DATA STORAGE BASED ON MEMORY PERSISTENCY

BACKGROUND

Unless otherwise indicated herein, the materials described in this section are not prior art to the claims in this application and are not admitted to be prior art by inclusion in this section.

A computing device may include a processor and a memory module. The memory module may include one or more memories. The memory module may include volatile memories and non-volatile memories. Data stored in non-volatile memories may be retained without using power.

SUMMARY

In some examples methods to store data in a memory module are generally described. The memory module may include a volatile portion and a non-volatile portion. The methods may include receiving, by a processor, a request to store the data. The request may include a virtual address of the data. The methods may further include determining, by the processor, a persistency of the data based on the virtual address. The methods may further include identifying, by the processor, a particular portion of the memory module based on the persistency. The methods may further include generating a command to store the data in the particular portion of the memory module. The particular portion of the memory module may correspond to the persistency of the data.

In some examples, a device effective to control storage of data in a memory module is generally described. The memory module may include a volatile portion and a non-volatile portion. The device may include a processor, where the processor may include a first unit. The first unit may be effective to receive a request to store the data. The request may include a virtual address. The first unit may further be effective to determine a persistency of the data based on the virtual address. The processor may further include a second unit. The second unit may be coupled to the first unit. The second unit may be effective to identify a particular portion of the memory module based on the persistency. The first unit may be further effective to generate a command to store the data in the particular portion of the memory module. The particular portion of the memory module may correspond to the persistency of the data.

In some examples, methods to modify a persistency of data stored in a memory module are generally described. The memory module may include a volatile portion and a non-volatile portion. The methods may include receiving, by a processor, a request to modify the persistency of the data. The data may be stored in a first page frame of a first portion of the memory module. The persistency of the data may be based on a storage location of the data in the memory module. The methods may further include controlling, by the processor, an operating system to perform the operation of locking at least a portion of a page table that corresponds to a virtual address mapped to a first page frame to activate a write-protected mode of the virtual address. The methods may further include controlling, by the processor, the operating system to perform the operation of allocating a second page frame of a second portion of the memory module. Allocation of the second page frame may be based on the request. The methods may further include controlling, by the processor, the operating system to perform the operation of copying the data from the first page frame to the second page frame to modify the storage location of the data. The methods may further include controlling, by the processor, an operating system to perform the operation of modifying a persistency attribute of the data in a page table to indicate a modification of the storage location of the data. The modification of the storage location of the data may be effective to modify the persistency of the data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to data storage based on memory persistency.

Briefly stated, technologies are generally described for methods and systems effective to store data in a memory module. The memory module may include a volatile portion and a non-volatile portion. The methods may include receiving, by a processor, a request to store the data. The request may include an indication of a virtual address of the data. The methods may further include determining, by the processor, the persistency of the data based on the virtual address. The methods may further include identifying, by the processor, a particular portion of the memory module based on the persistency. The methods may further include generating a command to store the data in the particular portion of the memory module. The particular portion of the memory module may correspond to the persistency of the data. The methods may further include controlling, by the processor, the operating system to update a translation lookaside buffer to indicate a storage location of the data.

Figure 1:
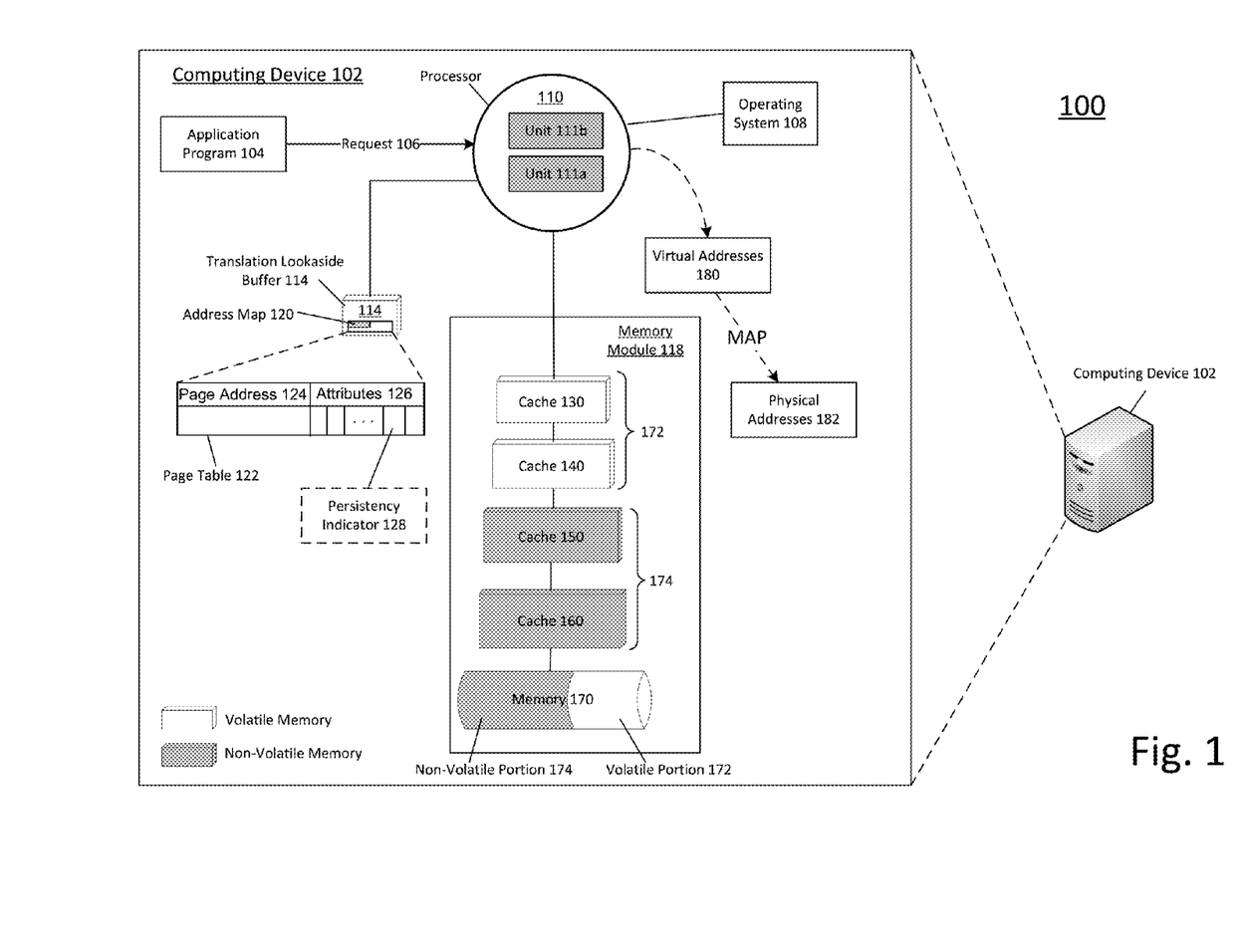
FIG. 1 illustrates an example system that can be utilized to implement data storage based on memory persistency.

FIG. 1 illustrates an example system 100 that can be utilized to implement data storage based on memory persistency, arranged in accordance with at least some embodiments described herein. System 100 may be implemented with a computing device 102. As will be described in more detail below, system 100 may be implemented to define a persistency of a data page (as either persistent or non-persistent). The persistency may be defined in response to a request to access the data page, and the request may be received from an application program. Each data page may include one or more data blocks. A persistent data page may be a data page where the request from the application program indicates that the data page is to be stored in a non-volatile memory. A non-persistent data page may be a data page where the request from the application program indicates that the data page is to be stored in volatile memory or where the request does not indicate a preference between volatile and non-volatile memory. System 100 may be further implemented to store the data page in a particular portion of a memory module based on the persistency of the data page. The particular portion of the memory module may be a volatile portion or may be a non-volatile portion of the memory module.

In an example, computing device 102 may include an apparatus or a device such as a computer, cellular phone, etc. Computing device 102 may include one or more components such as processors or controllers. In the example, computing device 102 may include a processor 110, a translation lookaside buffer 114, and/or a memory module 118. Memory module 118 may include a volatile portion 172 and a non-volatile portion 174. In some examples, memory module 118 may include a memory controller. Volatile portion 172 of memory module 118 may include volatile memory, which may be memory which uses power to retain stored data. Non-volatile portion 174 of memory module 118 may include non-volatile memory, which may be memory which does not use power to retain stored data. Volatile portion 172 may include a cache 130, a cache 140, and/or a first section of a memory 170. Non-volatile portion 174 may include a cache 150, a cache 160, and/or a second section of memory 170. Caches 130, 140, 150, 160 and memory 170 may be physical memory and may be configured or coupled to be in communication with each other. In some examples, cache 130 may include a L1 (level 1) cache, cache 140 may include a L2 (level 2) cache, cache 150 may include a L3 (level 3) cache, cache 150 may include a L4 (level 4 cache), and memory 170 may include a main memory of computing device 102.

Translation lookaside buffer 114 may be embodied as a cache memory, which may be part of memory module 118, and may be configured to store a page table 122. Page table 122 may be effective to indicate an address map 120 that may be effective to indicate or represent mappings between virtual addresses used by an application program and physical addresses associated with memory module 118 of computing device 102. For example, address map 120 may represent mappings between virtual addresses 180, which may be used by an application program 104, and physical addresses 182 associated with page frames of memory module 118. A page frame may be embodied as a page of physical memory in memory module 118. In some examples, address map 120 may be indicated by a table different from page table 122. Application program 104 may include an application that may be executed by processor 110.

Page table 122 may be effective to indicate attributes associated with data pages stored in memory module 118. Page table 122 may include a page address field 124 and an attributes field 126. Page address field 124 may indicate a storage location of data pages, such as an address among physical addresses 182, which may be an address of a particular page frame in memory module 118. Attributes field 126 may include one or more indicators effective to indicate attributes of a corresponding data page. Attributes field 126 may include a persistency indicator 128 effective to indicate whether a corresponding data page is a persistent data page. In some examples, persistency indicator 128 may be represented as binary values, such as "0" or "1", to indicate a persistent or non-persistent corresponding data page.

Processor 110 may be configured to control an operating system 108 to perform various operations. For example, processor 110 may control operating system 108 to map virtual addresses 180 to physical addresses 182. In some examples, processor 110 may control operating system 108 to update tables, such as page table 122, in translation look aside buffer 114. In some examples, processor 110 may control operating system 108 to modify attributes 126 of page table 122. In some examples, processor 110 may include logic circuits configured to perform lookup in page table 122 in response to a miss at translation lookaside buffer 114. Physical addresses 182 may include addresses effective to identify page frames of memory module 118. As will be described in more detail below, physical addresses 182 may include at least a set of volatile addresses and a set of non-volatile addresses. Volatile addresses may be addresses effective to identify page frames in volatile portion 172 of memory module 118. Non-volatile addresses may be addresses effective to identify page frames in non-volatile portion 174 of memory module 118.

In some examples, processor 110 may include two or more units such as units 111a, 111b, where each unit 111a, 111b, may be effective to perform respective operations. For example, unit 111a may be effective to facilitate transmission of data between application program 104 and processor 110. Unit 111b may be effective to control operating system 108 to manage translation lookaside buffer 114 and/or memory module 118. Units 111a, 111b of processor 110 may include integrated circuits such as, for example, system-on-a-chip (SoC), field-programmable gate array (FPGA), etc. In some examples, a memory management unit may be implemented with processor 110 such that units 111a, 111b, may be components of the memory management unit. In some examples, units 111a, 111b may be components of a memory management unit outside of processor 110, where the memory management unit may be configured to be in communication with processor 110.

In an example, during an execution of application program 104 by processor 110, application program 104 may send a request 106 to processor 110. Request 106 may be a request to store a data page and may include an indication of a virtual address among virtual addresses 180. In some examples, the virtual address of request 106 may be used to determine a persistency of the data page. Processor 110 may determine a persistency of the requested data page based on the virtual address, such as by identifying, with use of page table 122, whether the virtual address in request 106 may be mapped to a volatile or a non-volatile portion of memory module 118. Processor 110 may cause a lookup of page table 122 in translation lookaside buffer 114 to determine the persistency of the requested data page. Processor 110 may generate a command to store the data page in a particular portion of memory module 118, where the virtual address in request 106 may be mapped to a physical address of the particular portion of memory module 118. In another example, request 106 may be a request to load a data page. In another example, request 106 may be a request to modify a persistency of a data page that may be stored in memory module 118. Processor 110 may control operating system 108 to update page table 122, which may include an update of a value of persistency indicator 128 in page table 122, and may change a storage location of the requested data page, to reflect a persistency of the requested data page.

Figure 2:
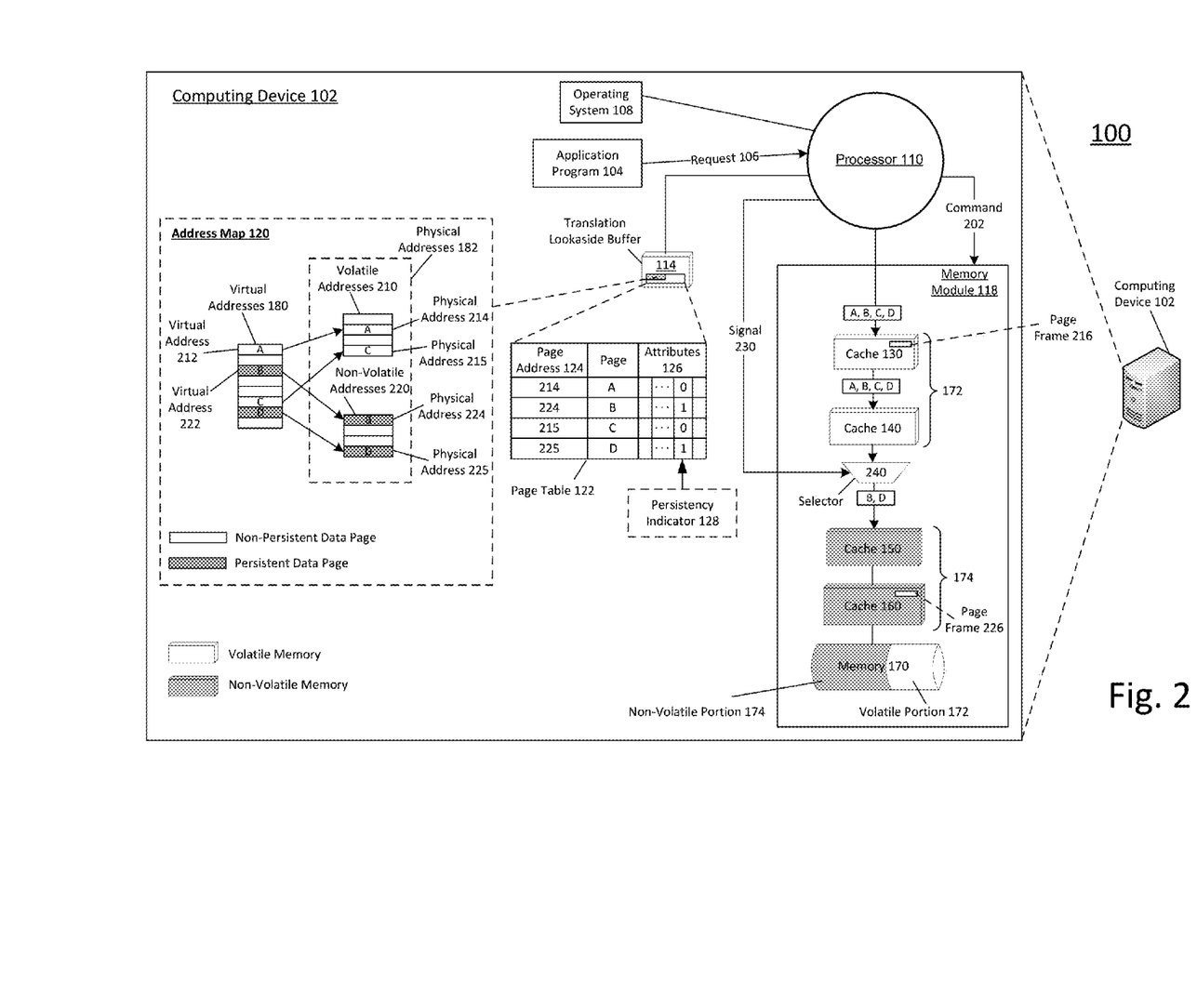
FIG. 2 illustrates the example system of FIG. 1 with additional detail relating to management of data storage based on memory persistency.

FIG. 2 illustrates the example system of FIG. 1 with additional detail relating to management of data storage based on memory persistency, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity and brevity.

Processor 110 may control operating system 108 to map virtual addresses 180 to physical addresses 182. In an example, operating system 108 may partition physical addresses 182 into volatile addresses 210 and non-volatile addresses 220. Volatile addresses 210 may be physical addresses of page frames in volatile portion 172 of memory module 118. Non-volatile addresses 220 may be physical addresses of page frames in non-volatile portion 174 of memory module 118. Operating system 108 may generate address map 120 of page table 122 to represent the mapping, and may further be configured to update address map 120. Processor 110 may facilitate storage of data based on mappings represented by address map 120.

In an example, data pages A, B, C, and D may each include one or more memory blocks. Data pages A and C may include non-persistent data blocks, and data pages B and D may include persistent data blocks. Processor 110 may receive request 106, where request 106 may be a request to store data page A. Request 106 may include an indication of virtual address 212. In response to the receipt of request 106, processor 110 may analyze, such as performing a lookup of, address map 120 in page table 122 to identify physical address 214 of a page frame 216 in cache 130, or volatile portion 172. Persistency attribute 128 of data page A in page table 122 may be a value of "0" to indicate that data page A may be associated with, or mapped to, volatile portion 172 of memory module 118. Processor 110 may determine that data page A includes non-persistent data blocks based on physical address 214 being an address of volatile portion 172 of memory module 118. Processor 110 may generate a command 202 to store data page A in page frame 216 and may control operating system 108 to update page table 122 in translation lookaside buffer 114 to indicate that data page A is stored in page frame 216. The indication that data page A is being stored in page frame 216 may reflect a persistency of data page A.

In another example, request 106 may be a request to store data page B, and may include an indication of virtual addresses 222. In response to the receipt of request 106, processor 110 may analyze address map 120 in page table 122 to identify physical address 224 of a page frame 226 in cache 160, or non-volatile portion 174. Persistency attribute 128 of data page B in page table 122 may be a value of "1" to indicate that data page B may be associated with, or mapped to, non-volatile portion 174 of memory module 118. Processor 110 may determine that data page B includes persistent data blocks based on physical address 214 being an address of non-volatile portion 174 of memory module 118.

In response to the determination that data page B includes persistent data blocks, processor 110 may execute a write-through policy by generating a signal 230. Signal 230 may be a signal effective to activate a selector 240, which may be embodied as a multiplexer positioned between volatile portion 172 and non-volatile portion 174. In some examples, selector 240 may be embodied as a switch configured to toggle a connection between volatile portion 172 and non-volatile portion 174. When selector 240 is activated, data may be written from volatile portion 172 to non-volatile portion 174. After execution of the write-through policy, Processor 110 may generate command 202 to store data page B in page frame 226 and may control operating system 108 to update page table 122 in translation lookaside buffer 114 to indicate that data page B is stored in page frame 226. The indication that data page B is being stored in page frame 226 may reflect a persistency of data page B. In an example, cache 130, cache 140, and cache 150 may be inclusive caches where a copy of data page B may be stored in cache 130, cache 140, and cache 150. For inclusive caches, an execution of the write-through policy may include writing data page B in a local cache, such as a cache closest to processor 110 (e.g. cache 130), and writing data page B to a subsequent cache (e.g. cache 140) until data page B is written in a cache of non-volatile portion 174 of memory module 118 (e.g. cache 150). In another example, cache 130 and cache 140 may be inclusive caches but cache 150 may be a non-inclusive cache such that a copy of data page B is stored in cache 130 and cache 140, but not cache 150. When cache 150 is non-inclusive, an execution of the write-through policy may include writing data page B in a local cache (e.g. cache 130), writing data page B to a subsequent cache (e.g. cache 140), then further fetching the copy of data page B from memory 170 which may be a main memory of computing device 102.

In the example where caches 130, 140, 150 may be inclusive caches, command 202 may include a first instruction to first store data page B in cache 130 of volatile portion 172, then in cache 140 of volatile portion 172. Command 202 may further include a second instruction to write data page B from cache 140 of volatile portion 172 to frame 226 in cache 150 of non-volatile portion 174, where selector 140 may be activated based on signal 230, in order to execute the second instruction.

Figure 3:
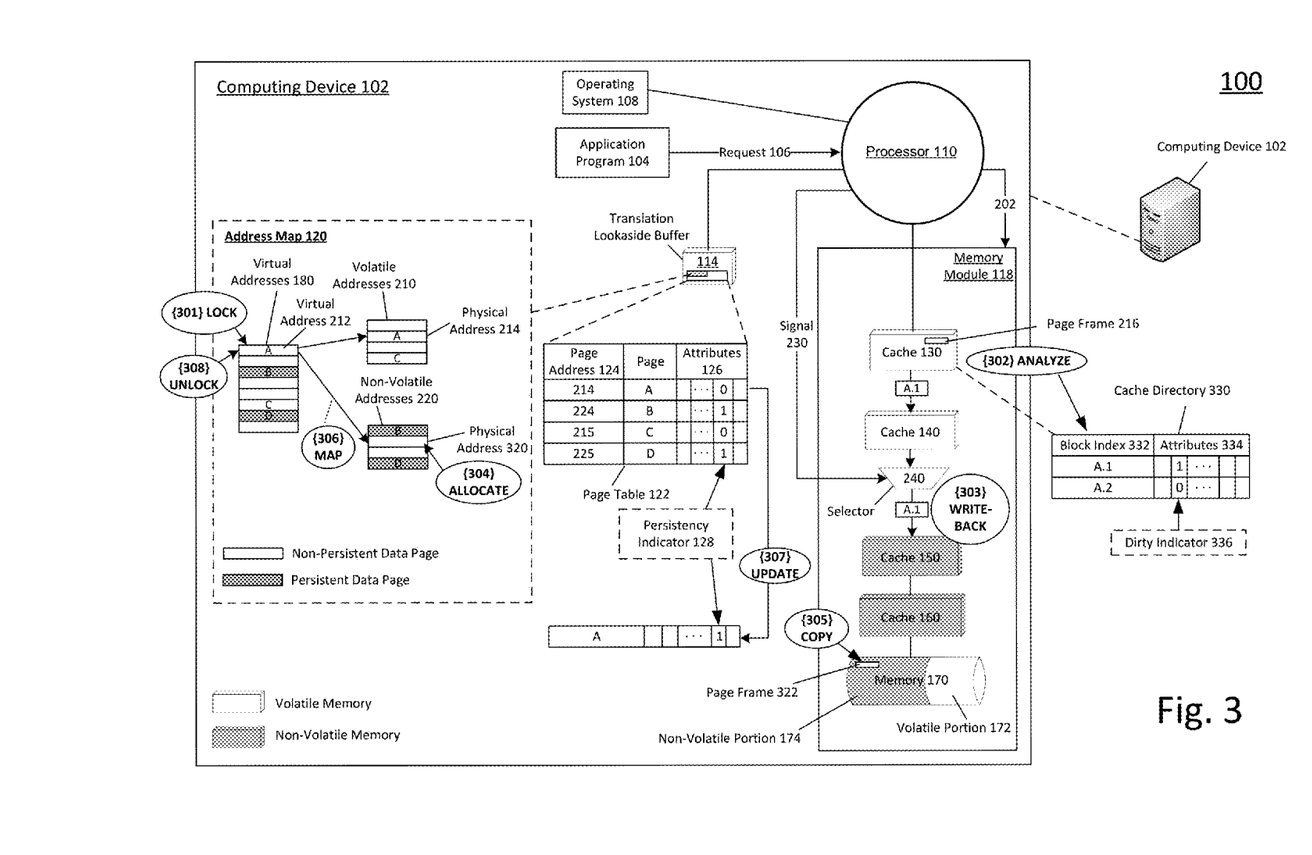
FIG. 3 illustrates the example system of FIG. 1 with additional detail relating to modifying a persistency of data.

FIG. 3 illustrates the example system of FIG. 1 with additional detail relating to modifying a persistency of data, arranged in accordance with at least some embodiments described herein. FIG. 3 is substantially similar to system 100 of FIG. 1, with additional details. Those components in FIG. 3 that are labeled identically to components of FIG. 1 will not be described again for the purposes of clarity and brevity.

System 100 may be effective to modify a persistency of a data page. Modification of a persistency of a data page from non-persistent to persistent may include operations 301, 302, 303, 304, 305, 306, 307, 308. Although illustrated as distinct operations, operations 301, 302, 303, 304, 305, 306, 307, 308 may be divided into additional operations, combined into fewer operations, supplemented with other operations, executed in different order, repeated or removed based on a particular implementation of system 100. At operation 301, processor 110 may receive request 106, where request 106 may be a request to modify persistency of data page A from non-persistent to persistent. In the example, data page A may be stored in page frame 216 of cache 130 in volatile portion 172. Processor 110 may control operating system 108 to lock virtual address 212, such as by locking a portion of page table 122 that may correspond to virtual address 212, to activate a write-protected mode for virtual address 212. In some examples, when the write-protected mode for virtual address 212 is activated, data page A may not be updated or overwritten. In some examples, operating system 108 may lock virtual address 212, or the portion of page table 122 that may correspond to virtual address 212, by modifying a protection attribute of data page A in page table 122.

At operation 302, processor 110 may analyze a cache directory 330 of cache 130, where cache 130 includes page frame 216. Cache directory 330 may include a block index field 332 effective to store identifications of data blocks of stored data pages in cache 130. Cache directory 330 may further include an attributes field 334 effective to indicate an attribute of each data block of stored data pages in cache 130. For example, attributes field 334 may include a column effective to store a dirty indicator 336, where dirty indicator 336 may be effective to indicate if a corresponding data block has been modified. In some examples, a dirty data block may indicate that the data block has been modified, but has yet to be updated in a main memory of computer device 102. In the example, data page A may include a data block A.1 and a data block A.2. Data block A.1 may be a dirty data block as indicated by dirty indicator 336. Operating system 108 may analyze dirty indicator 336 of each data block in data page A. Operating system 108 may identify data block A.1 based on a value of dirty indicator 336. For example, operating system 108 may identify data block A.1 as being dirty due to a value of '1' of dirty indicator 336 for data block A.1.

At operation 303, in response to identification of data block A.1 based on the value of dirty indicator 336, processor 110 may execute a write-back policy. Execution of the write-back policy may include writing the modified data block A.1 to non-volatile portion 174. During execution of the write-back policy, processor 110 may generate signal 230 to activate selector 240 in order for the modified version of data block A.1 to be written, such as by processor 110, from volatile portion 172 to non-volatile portion 174. Execution of write-back policy to write data block A.1 in non-volatile portion 174 may prevent a loss of data block A.1 in a power failure situation. Execution of write-back policy to write data block A.1 in non-volatile portion 174 may also ensure that data block A.1 being saved in memory module 118 is an updated version. In some examples, processor 110 may write, or cause a write operation of, data block A.1 to non-volatile portion 174. Processor 110 may continue to analyze cache directory 330 to identify dirty data blocks of data page A, and may continue to write the identified dirty data blocks to non-volatile portion 174. Processor 110 may deactivate selector 240 in response to a completion of writing, by operating system 108, dirty data blocks of data page A to non-volatile portion 174.

At operation 304, in response to a completion of writing dirty data blocks of data page A to non-volatile portion 174, operating system 108 may allocate a physical address, such as physical address 320, in non-volatile addresses 220. Physical address 320 may correspond to a page frame 322 in non-volatile portion 174. In response to allocation of physical address 320, processor 110 may copy, such as by writing, data page A from page frame 216 to page frame 322 (operation 305). In some examples, copying of data page A from page frame 216 to page frame 322 may be performed by a direct memory access controller outside of processor 110. Utilization of a direct memory access controller may alleviate the workload of processor 110. In response to copying data page A from page frame 216 to page frame 322, operating system 108 may map virtual address 212 to physical address 320 in address map 120 of page table 122 (operation 306). Operating system 108 may further update persistency indicator 128 for data page A in page table 122 (operation 307). Operating system 108 may further unlock virtual address 212, or a locked portion of page table 122 that may correspond to virtual address 212, in response to update of persistency indicator of data page A (operation 308), to deactivate the write-protected mode of virtual address 212.

Figure 4:
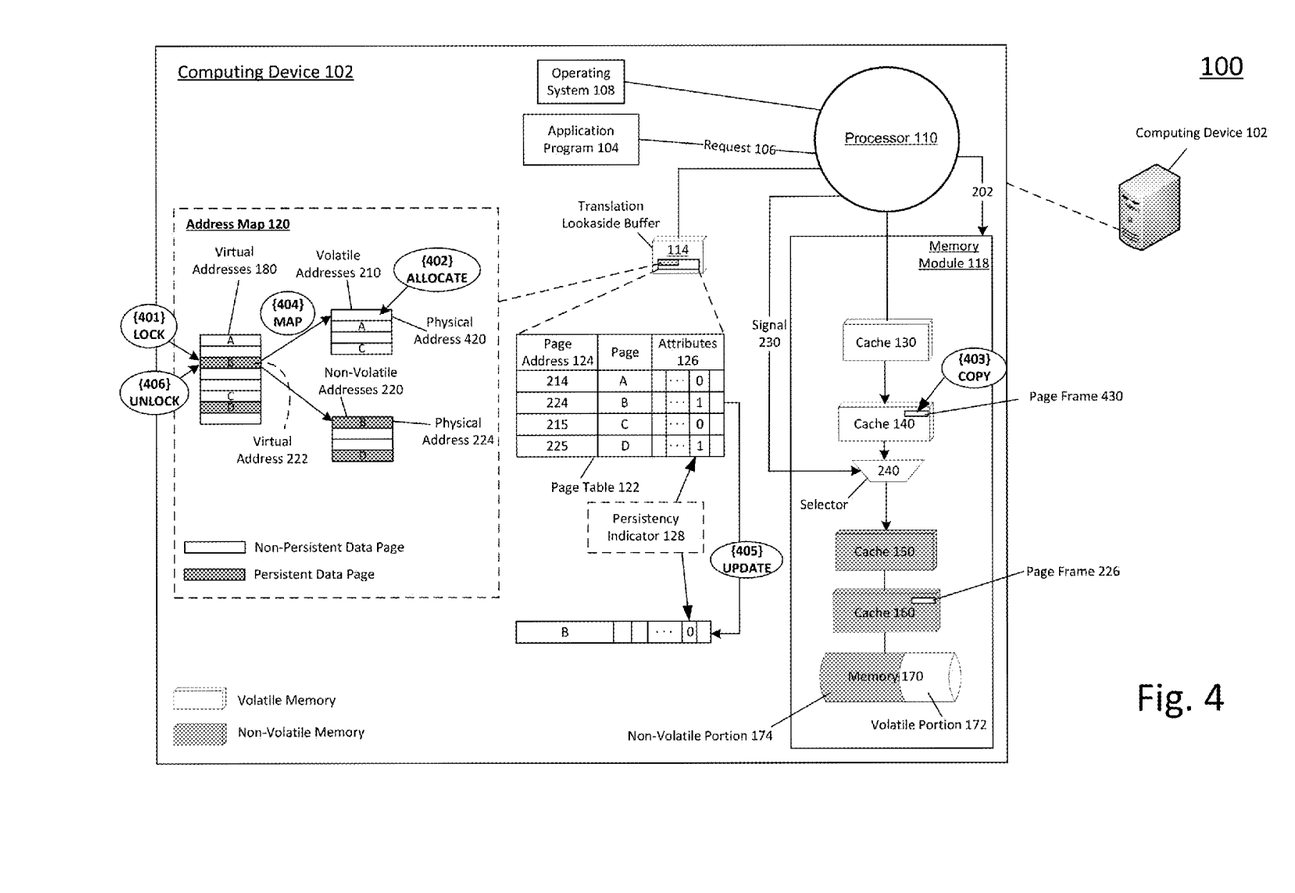
FIG. 4 illustrates the example system of FIG. 1 with additional detail relating to modifying a persistency of persistent data.

FIG. 4 illustrates the example system of FIG. 1 with additional detail relating to modifying a persistency of persistent data, arranged in accordance with at least some embodiments described herein. FIG. 4 is substantially similar to system 100 of FIG. 1, with additional details. Those components in FIG. 4 that are labeled identically to components of FIG. 1 will not be described again for the purposes of clarity and brevity.

Modification of persistency of a data page from persistent to non-persistent may include operations 401, 402, 403, 404, 405, 406. Although illustrated as distinct operations, operations 401, 402, 403, 404, 405, 406 may be divided into additional operations, combined into fewer operations, executed in different order, supplemented with other operations, repeated or removed based on a particular implementation of system 100. At operation 401, processor 110 may receive request 106, where request 106 may be a request to modify a persistency of data page B from persistent to non-persistent. In the example, data page B may be stored in page frame 226 of cache 160 in non-volatile portion 174. At operation 401, processor 110 may control operating system 108 to lock virtual address 222, or to lock a portion of page table 122 that may correspond to virtual address 222. In some examples, operating system 108 may lock virtual address 222 by modifying a protection attribute of data page B in page table 122.

At operation 402, in response to locking virtual address 222 or locking the portion of page table 122 that may correspond to virtual address 222, operating system 108 may allocate a physical address, such as physical address 420, in volatile addresses 210. Physical address 420 may correspond to a page frame 430 in volatile portion 172. In response to allocation of physical address 420, processor 110 may copy, such as by writing, data page B from page frame 226 to page frame 430 (operation 403). In response to copying data page B from page frame 226 to page frame 430, operating system 108 may map virtual address 222 to physical address 420 in address map 120 of page table 122 (operation 404). Operating system 108 may further update persistency indicator 128 for data page B in page table 122 (operation 405). Operating system 108 may further unlock virtual address 222, or a locked portion of page table 122 that may correspond to virtual address 222, in response to updating of persistency indicator of data page B (operation 406).

In some examples, modification of persistency of a data page from persistent to non-persistent may not involve execution of operations 401, 402, 403, 404, 405, 406 as described above. Non-persistent data, in some examples, may be stored in either volatile or non-volatile memory. In some examples, a decision to execute operations 401, 402, 403, 404, 405, 406 to modify a persistency of a data page from persistent to non-persistent may be based on usage of memory module 118. For example, if non-volatile portion 174 includes an amount of stored data that exceeds a particular threshold, processor 110 may execute, or may control operating system 108 to execute operations 401, 402, 403, 404, 405, 406 to modify a persistent data page as mentioned above. If non-volatile portion 174 includes adequate storage space, operations 402, 403, 404, 405 may not be performed, but operations 401, 406 may be performed.

Among other possible features, a system in accordance with the disclosure may benefit programmers and users of application programs. A system may allow programmers to define a persistency during programming of an application program. Programmers may use the system to declare which data should be stored in non-volatile memory in order to protect the data during a malfunction such as power failure. Users of application programs may also define data which is preferred to be stored in non-volatile memory. Further, a system may provide power saving benefits such as by a selective execution of write-through policies based on a persistency of data. Programmers may also change a persistency of data, such as from persistent to non-persistent, in order to avoid usage of non-volatile memory to lower power consumption.

Figure 5:
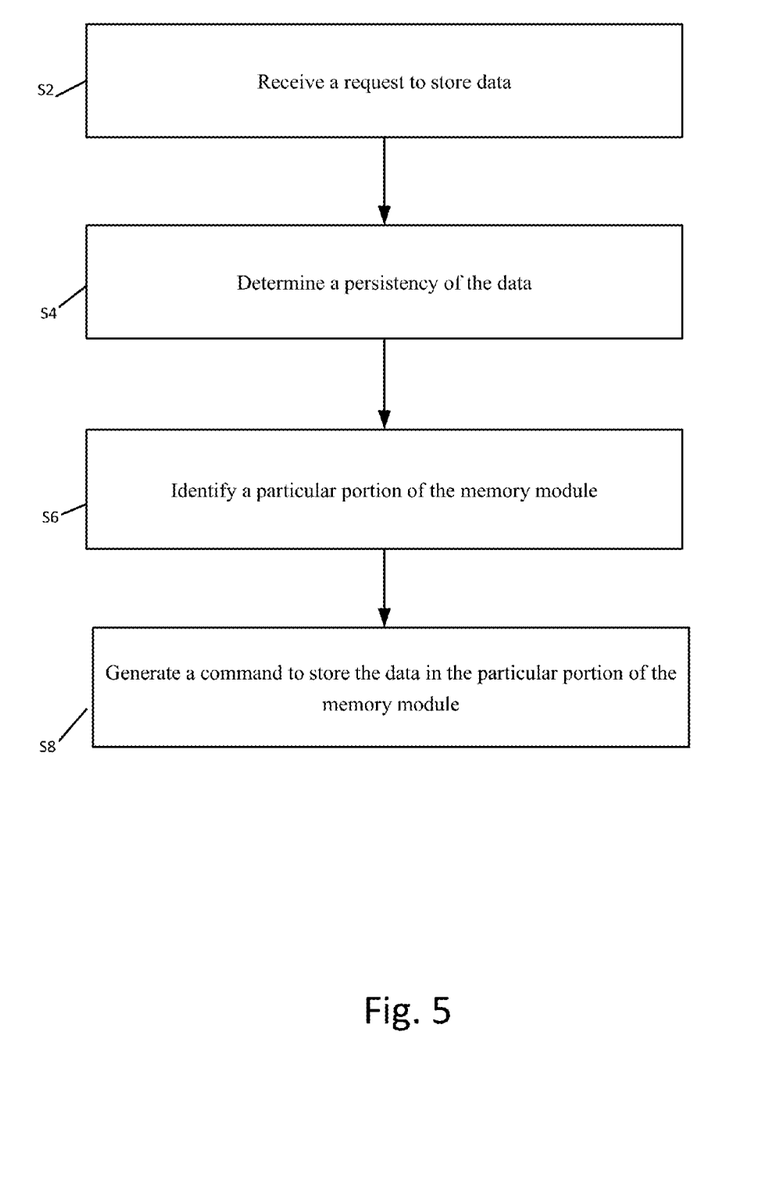
FIG. 5 illustrates a flow diagram for an example process to implement data storage based on memory persistency.

FIG. 5 illustrates a flow diagram for an example process to implement data storage based on data persistency, arranged in accordance with at least some embodiments presented herein. The process in FIG. 5 could be implemented using, for example, system 100 discussed above. An example process may include one or more operations, actions, or functions as illustrated by one or more of blocks S2, S4, S6, and/or S8. Although illustrated as discrete blocks, various blocks may be divided into additional blocks, combined into fewer blocks, supplemented with additional blocks representing other operations, actions, or functions, or eliminated, depending on the particular implementation. The process in FIG. 5 may be used by a computing device that includes a processor, such as processor 110, and a memory module, such as a memory module 118 as described above. The memory module may include a volatile portion and a non-volatile portion.

Processing may begin at block S2, "Receive a request to store data". At block S2, a processor (e.g. processor 110) may receive a request to store data in a memory module (e.g. memory module 118). The memory module may include a volatile portion and a non-volatile portion. The request may include a virtual address associated with the data.

Processing may continue from block S2 to block S4, "Determine a persistency of the data". At block S4, the processor may determine a persistency of the data based on the virtual address.

Processing may continue from block S4 to block S6, "Identify a particular portion of the memory module". At block S6, the processor may identify a particular portion of the memory module based on the virtual address. Identification of the particular portion of the memory module may include analyzing a page table (e.g. address map 120 of page table 122) to determine a physical address in the particular portion, where the virtual address may be mapped to the physical address. Identification of the particular portion of the memory module may further include identifying a page frame in the memory module that corresponds to the physical address.

Processing may continue from block S6 to block S8, "Generate a command to store the data in the particular portion of the memory module". At block S8, the processor may generate a command to store the data in the particular portion of the memory module. The particular portion of the memory module may correspond to the persistency of the data. The processor may control the operating system to update a page table (e.g. page table 122) after the processor generates the command. An update of the page table may include an update of a storage location of the data, such as an indication that the data may be stored in the particular portion of the memory module.

Figure 6:
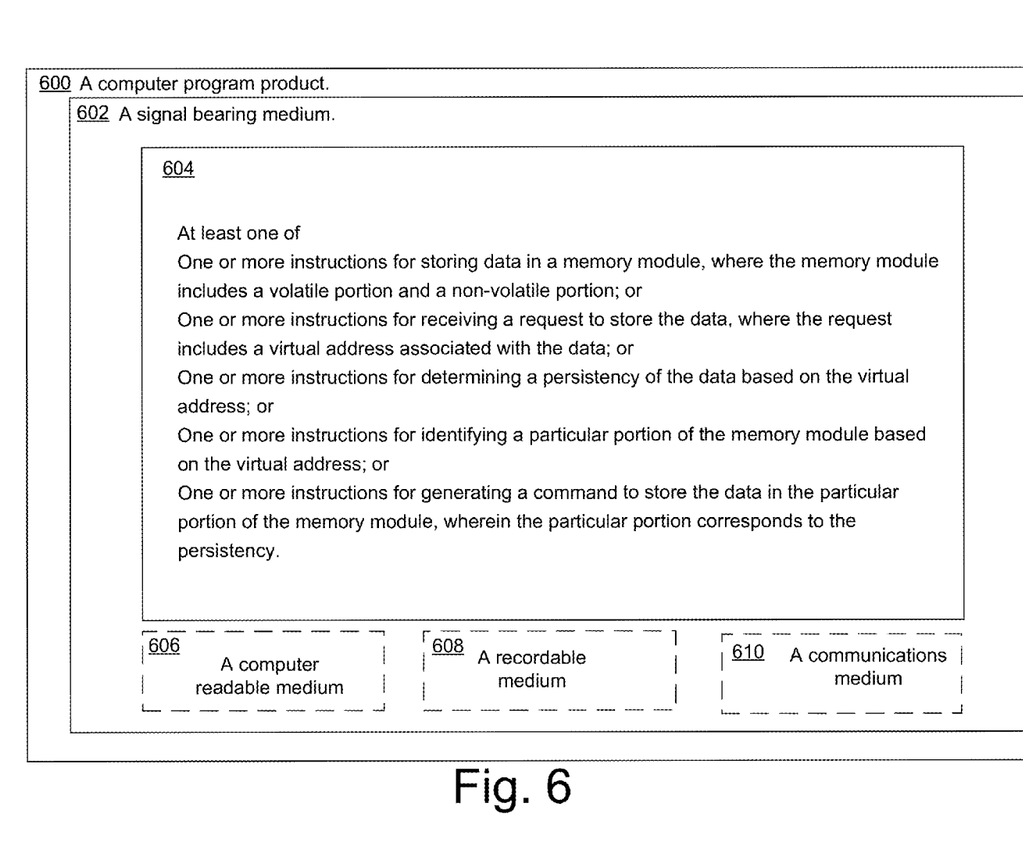
FIG. 6 illustrates an example computer program product that can be utilized to implement data storage based on memory persistency.

FIG. 6 illustrates an example computer program product that can be utilized to implement data storage based on memory persistency, arranged in accordance with at least some embodiments described herein. Program product 600 may include a signal bearing medium 602. Signal bearing medium 602 may include one or more instructions 604 that, in response to execution by, for example, a processor, may provide the functionality and features described above with respect to FIGS. 1-5. Thus, for example, referring to system 100, processor 110 may undertake or otherwise control performance of one or more of the blocks shown in FIG. 5 in response to instructions 604 conveyed to the system 100 by medium 602.

In some implementations, signal bearing medium 602 may encompass a computer-readable medium 606, such as, but not limited to, a hard disk drive, a Compact Disc (CD), a Digital Video Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, program product 600 may be conveyed to one or more modules of the system 100 by an RF signal bearing medium 602, where the signal bearing medium 602 is conveyed by a wireless communications medium 610 (e.g., a wireless communications medium conforming with the IEEE 802.11 standard).

Figure 7:
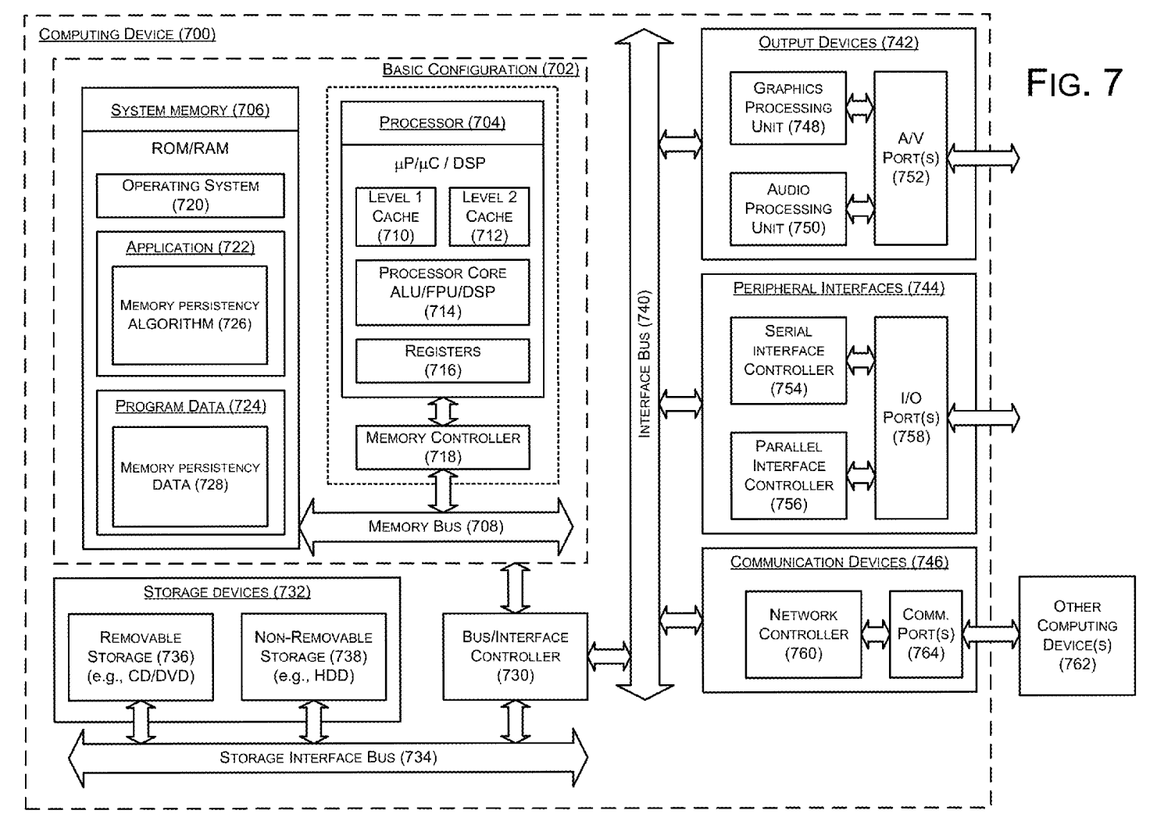
FIG. 7 is a block diagram illustrating an example computing device that can be utilized to implement data storage based on memory persistency; all arranged according to at least some embodiments described herein.

FIG. 7 is a block diagram illustrating an example computing device that can be utilized to implement data storage based on memory persistency, arranged in accordance with at least some embodiments described herein. In a very basic configuration 702, computing device 700 (which may be embodied by the previously described computing device 102) typically includes one or more processors 704 (which may be the previously described processor 110) and a system memory 706. A memory bus 708 may be used for communicating between processor 704 and system memory 706. The various components (e.g., caches, operating system, etc.) shown and described herein with respect to computing device 700 may be embodied by the various analogous components shown and described above with respect to FIGS. 1-6.

Depending on the desired configuration, processor 704 may be of any type including but not limited to a microprocessor (µP), a microcontroller (µC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720 (which may be the previously described operating system 108), one or more applications 722, and program data 724. Application 722 may include a memory persistency algorithm 726 that is arranged to perform the functions and operations as described herein including those described with respect to FIGS. 1-6 in connection with system 100. Program data 724 may include memory persistency data 728 that may be useful for implementation of data storage based on memory persistency as is described herein. In some embodiments, application 722 may be arranged to operate with program data 724 in cooperation with operating system 720 such that implementations of data storage based on data persistency may be provided. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, may be apparent from the foregoing descriptions. Such modifications and variations are intended to fall within the scope of the appended claims. The present disclosure is to be limited only by the terms of the appended claims, along with the full scope of equivalents to which such claims are entitled. This disclosure is not limited to particular methods, reagents, compounds compositions or biological systems, which can, of course, vary. Terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). Virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, one will recognize that the disclosure is also thereby described in terms of any individual member or subgroup of members of the Markush group.

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to store data in a memory module, wherein the memory module includes a volatile portion and a non-volatile portion, the method comprising, by a processor:
   receiving a request to store the data in the memory module, wherein the request includes a virtual address associated with the data;
   determining a persistency of the data to be stored in the memory module based on the virtual address in the request, wherein determining the persistency includes identifying, with use of a page table in the memory module, whether the virtual address in the request is mapped to the volatile portion of the memory module or the non-volatile portion of the memory module, and wherein the page table includes a persistency attribute that indicates the persistency of the data;
   identifying a particular portion of the memory module based on the virtual address;
   generating a command to store the data in the particular portion of the memory module, wherein the particular portion corresponds to the determined persistency, and wherein generating the command includes generating a command to store the data in a first page frame in the memory module;
   mapping the virtual address to the first page frame;
   receiving another request to modify the persistency of the data; and
   controlling an operating system to perform operations of:
      allocating a second page frame in the volatile portion of the memory module,
      wherein prior to allocating the second page frame, the method includes locking at least a portion, of the page table, which corresponds to the virtual address;
      copying the data from the first page frame to the second page frame;
      modifying the persistency attribute of the data in the page table,
      wherein prior to modifying the persistency attribute, the method includes mapping the virtual address, which corresponds to the locked portion of the page table, to the second page frame; and
      subsequent to modifying the persistency attribute, unlocking the locked portion of the page table that corresponds to the virtual address.

2. The method of claim 1, wherein identifying the particular portion of the memory module includes:
   analyzing the page table to determine a physical address in the particular portion of the memory module, wherein the virtual address is mapped to the physical address; and
   identifying the first page frame in the memory module, wherein the first page frame corresponds to the physical address.

3. The method of claim 1, further comprising controlling the operating system to perform operations of:
   mapping a first set of virtual addresses, accessible by the processor, to a first set of physical addresses, wherein the first set of physical addresses is associated with the volatile portion;
   mapping a second set of virtual addresses, accessible by the processor, to a second set of physical addresses, wherein the second set of physical addresses is associated with the non-volatile portion; and generating a map to indicate the mapping of the first set of virtual addresses to the first set of physical addresses, and to indicate the mapping of the second set of virtual addresses to the second set of physical addresses.

4. The method of claim 1, further comprising controlling the operating system to perform an operation of updating the page table, after generating the command, wherein updating the page table comprises updating a storage location of the data to reflect the determined persistency of the data.

5. The method of claim 1, wherein the particular portion includes the non-volatile portion, and wherein generating the command further includes generating:
   a first instruction to store the data in the volatile portion; and
   a second instruction to write the data from the volatile portion to the non-volatile portion.

6. The method of claim 1, wherein determining the persistency of the data includes analyzing a translation lookaside buffer.

7. A method to store data in a memory module, wherein the memory module includes a volatile portion and a non-volatile portion, the method comprising, by a processor:
   receiving a request to store the data in the memory module, wherein the request includes a virtual address associated with the data;
   determining a persistency of the data to be stored in the memory module based on the virtual address in the request, wherein determining the persistency includes identifying, with use of a page table in the memory module, whether the virtual address in the request is mapped to the volatile portion of the memory module or to the non-volatile portion of the memory module, and wherein the page table includes a persistency attribute that indicates the persistency of the data;
   identifying a particular portion of the memory module based on the virtual address;
   generating a command to store the data in the particular portion of the memory module, wherein the particular portion corresponds to the determined persistency, and wherein generating the command includes generating a command to store the data in a first page frame in the volatile portion of the memory module, and wherein the virtual address is mapped to the first page frame;
   receiving another request to modify the persistency of the data; and
   controlling an operating system to perform operations of:
      allocating a second page frame in the non-volatile portion of the memory module,
      wherein prior to allocating the second page frame, the method includes locking at least a portion, of the page table, which corresponds to the virtual address;
      copying the data from the first page frame to the second page frame;
      modifying the persistency attribute of the data in the page table,
      wherein prior to modifying the persistency attribute, the method includes mapping the virtual address, which corresponds to the locked portion of the page table, to the second page frame; and
      subsequent to modifying the persistency attribute, unlocking the locked portion of the page table, which corresponds to the virtual address.

8. The method of claim 1, wherein prior to allocating the second page frame, the method includes:
   identifying a dirty data block in the data; and
   after identifying the dirty data block, writing the dirty data block to the non volatile volatile portion of the memory module.

9. A device effective to control storage of data in a memory module, wherein the memory module includes a volatile portion and a non-volatile portion, the device comprising:
   a processor that includes:
      a first unit effective to:
         receive a request to store the data in the memory module, wherein the request includes a virtual address associated with the data; and
         determine a persistency of the data to be stored in the memory module based on the virtual address included in the request, wherein the determination is performed by identification of whether the virtual address in the request is mapped to the volatile portion of the memory module or the non-volatile portion of the memory module; and
      a second unit, coupled to the first unit, effective to identify a particular portion of the memory module based on the virtual address,
      wherein the first unit is further effective to:
         generate a command to store the data in the particular portion of the memory module, wherein the command includes a command to store the data in a first page frame in the volatile portion of the memory module, wherein the particular portion corresponds to the persistency, and wherein the virtual address is mapped to the first page frame; and
         receive a request to modify the persistency of the data, and
      wherein, in response to the receipt, by the first unit, of the request to modify the persistency of the data, the second unit is further effective to control an operating system to:
         allocate a second page frame in the non-volatile portion;
         modify a protection attribute to lock at least a portion, of a page table, which corresponds to the virtual address, prior to the allocation of the second page frame:
         copy the data from the first page frame to the second page frame;
         modify a persistency attribute of the data in the page table;
         map the virtual address to the second page frame, prior to the modification of the persistency attribute; and
         modify the protection attribute to unlock the portion, of the page table, which corresponds to the virtual address, subsequent to the modification of the persistency attribute.

10. The device of claim 9, wherein the second unit is further effective to:
    determine an address in the particular portion of the memory module, wherein the virtual address is mapped to the determined address in the particular portion of the memory module; and
    identify the first page frame in the memory module based on the determined address.

11. The device of claim 9, wherein the second unit is further effective to control the operating system to:
    generate a map to indicate a mapping of a first set of virtual addresses to a first set of physical addresses associated with the volatile portion, and to indicate a mapping of a second set of virtual addresses to a second set of physical addresses associated with the non-volatile portion.

12. The device of claim 9, wherein the second unit is further effective to, in response to the generation of the command, control the operating system to update a storage location of the data to reflect the persistency of the data.

13. The device of claim 9, wherein the determination of the persistency of the data is based on a translation lookaside buffer.

14. The device of claim 9, wherein the second unit is further effective to, prior to the allocation of the second page frame:
identify a dirty data block in the data; and
in response to the identification of the dirty data block, write the dirty data block to the non-volatile portion of the memory module.

15. A device effective to control storage of data in a memory module, wherein the memory module includes a volatile portion and a non-volatile portion, the device comprising:
a processor that includes:
a first unit effective to:
receive a request to store the data in the memory module, wherein the request includes a virtual address associated with the data; and
determine a persistency of the data to be stored in the memory module based on the virtual address included in the request, wherein the determination is performed by identification of whether the virtual address in the request is mapped to the volatile portion of the memory module or the non-volatile portion of the memory module; and
a second unit, coupled to the first unit, effective to identify a particular portion of the memory module based on the virtual address,
wherein the first unit is further effective to:
generate a command to store the data in the particular portion of the memory module, wherein the command includes a command to store the data in a first page frame in the memory module, wherein the particular portion corresponds to the persistency, and wherein the virtual address is mapped to the first page frame; and
receive a request to modify the persistency of the data, and
wherein in response to the receipt, by the first unit, of the request to modify the persistency of the data, the second unit is further effective to control an operating system to:
allocate a second page frame in the volatile portion of the memory module:
modify a protection attribute of the data to lock at least a portion, of a page table, which corresponds to the virtual address, prior to the allocation of the second page frame;
copy the data from the first page frame to the second page frame;
modify a persistency attribute of the data in the page table;
map the virtual address to the second page frame, prior to the modification of the persistency attribute; and modify the protection attribute of the data to unlock the portion, of the page table, which corresponds to the virtual address subsequent to the modification of the persistency attribute.

16. A method to modify a persistency of data stored in a memory module, wherein the memory module includes a volatile portion and a non-volatile portion, the method comprising, by a processor:
receiving a request to modify the persistency of the data, wherein the data is stored in a first page frame of a first portion of the memory module, and wherein the persistency of the data is determined based on whether the data is stored in the volatile portion of the memory module or the non-volatile portion of the memory module; and
controlling an operating system to perform operations of:
locking at least a portion, of a page table, which corresponds to a virtual address mapped to the first page frame, wherein the locking activates a write-protected mode of the virtual address;
based on the request, allocating a second page frame of a second portion of the memory module;
copying the data from the first page frame to the second page frame to modify a storage location of the data; and
modifying a persistency attribute of the data in the page table to indicate the modification of the storage location of the data, wherein the modification of the storage location of the data is effective to modify the persistency of the data, and wherein the persistency attribute is effective to indicate whether the second page frame includes the volatile portion.

17. The method of claim 16, further comprising, controlling the operating system to perform operations of:
prior to modifying the persistency attribute, mapping the locked portion, of the page table, which corresponds to the virtual address, to the second page frame; and
subsequent to modifying the persistency attribute, unlocking the locked portion, of the page table, which corresponds to the virtual address, to deactivate the write-protected mode of the virtual address.

18. The method of claim 16, wherein the first portion includes the volatile portion of the memory module, and wherein the second portion includes the non-volatile portion of the memory module.

19. The method of claim 18, further comprising prior to allocating the second page frame:
identifying a dirty data block in the data; and
after identifying the dirty data block, writing the dirty data block from the volatile portion of the memory module to the non-volatile portion of the memory module.

20. The method of claim 16, wherein the first portion includes the non-volatile portion of the memory module, and wherein the second portion includes the volatile portion of the memory module.

21. The method of claim 16, further comprising prior to allocating the second page frame, identifying a dirty data block in the data with an indicator, wherein the indicator indicates that the data block in the data is modified and is yet to be updated in the memory module.

* * * * *

UNITED STATES PATENT AND TRADEMARK OFFICE
CERTIFICATE OF CORRECTION

PATENT NO. : 9,916,255 B2
APPLICATION NO. : 14/567278
DATED : March 13, 2018
INVENTOR(S) : Solihin It is certified that error appears in the above-identified patent and that said Letters Patent is hereby corrected as shown below:

In Column 16, Line 2, in Claim 8, delete "non volatile volatile" and insert -- volatile --, therefor.

In Column 17, Line 52, in Claim 15, delete "module:" and insert -- module; --, therefor.

Signed and Sealed this
Twenty-sixth Day of June, 2018

Andrei Iancu
*Director of the United States Patent and Trademark Office*